(12) United States Patent
Watanabe et al.

(10) Patent No.: US 9,212,740 B2
(45) Date of Patent: Dec. 15, 2015

(54) SHIFT DEVICE

(71) Applicant: KABUSHIKI KAISHA TOKAI RIKA DENKI SEISAKUSHO, Aichi (JP)

(72) Inventors: Hironori Watanabe, Aichi (JP); Makoto Yamamoto, Aichi (JP); Koji Imai, Aichi (JP); Munetoshi Makimura, Aichi (JP); Shosaku Watarai, Aichi (JP); Katsushi Miwa, Aichi (JP); Toshiharu Katagiri, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 14/553,016

(22) Filed: Nov. 25, 2014

(65) Prior Publication Data

US 2015/0152958 A1 Jun. 4, 2015

(30) Foreign Application Priority Data

Dec. 3, 2013 (JP) .................................. 2013-250152

(51) Int. Cl.
| | | |
|---|---|---|
| *B60K 17/04* | (2006.01) | |
| *B60K 17/12* | (2006.01) | |
| *B60K 20/00* | (2006.01) | |
| *G05G 5/08* | (2006.01) | |
| *F16H 59/08* | (2006.01) | |
| *F16H 61/22* | (2006.01) | |

(52) U.S. Cl.
CPC ............... *F16H 59/08* (2013.01); *F16H 61/22* (2013.01); *F16H 2059/081* (2013.01); *F16H 2061/223* (2013.01)

(58) Field of Classification Search
CPC ... F16H 59/08; F16H 2059/081; F16H 61/22; F16H 2061/223; F16H 63/42; F16H 2063/423; F16H 59/0278; F16H 2059/0282; F16H 61/32
See application file for complete search history.

(56) References Cited

U.S. PATENT DOCUMENTS

| 7,971,498 | B2 | 7/2011 | Meyer et al. | |
|---|---|---|---|---|
| 8,051,740 | B2 | 11/2011 | Giefer et al. | |
| 2003/0029261 | A1* | 2/2003 | DeJonge ................ | B60K 37/06 74/335 |
| 2006/0037424 | A1* | 2/2006 | Pickering ............... | B60K 37/06 74/73.3 |
| 2009/0107287 | A1* | 4/2009 | Seki ....................... | B60K 37/06 74/504 |
| 2011/0025488 | A1* | 2/2011 | Leon ...................... | B60K 37/06 340/456 |
| 2012/0218097 | A1* | 8/2012 | Woo ........................ | F16H 63/42 340/456 |

FOREIGN PATENT DOCUMENTS

| JP | 2008-511063 | 4/2008 |
|---|---|---|
| JP | 2008-526605 | 7/2008 |

* cited by examiner

*Primary Examiner* — William Kelleher
*Assistant Examiner* — Jake Cook
(74) *Attorney, Agent, or Firm* — Greenblum & Bernstein, P.L.C.

(57) ABSTRACT

A shift device includes a knob rotated to select a mode of a vehicle transmission. A rotary detent member is rotated to a rotation position corresponding to the selected transmission mode. The rotary detent member is coaxial with the knob. A connecting member connects the knob and the rotary detent member when located at the first position. The connecting member is disconnected from the knob when located at the second position. A motor rotates the connecting member and the rotary detent member. During a normal operation in which a certain condition is unsatisfied, a control circuit controls the motor to hold the connecting member at the first position. When the certain condition is satisfied, the control circuit controls the motor to move the connecting member to the second position and move the rotary detent member to a rotation position corresponding to a parking mode.

5 Claims, 7 Drawing Sheets

SHIFT DEVICE

CROSS-REFERENCE TO RELATED APPLICATIONS

This application is based upon and claims the benefit of priority from prior Japanese Patent Application No. 2013-250152, filed on Dec. 3, 2013, the entire contents of which are incorporated herein by reference.

BACKGROUND

The present invention relates to a shift device.

Japanese National Phase Laid-Out Patent Publication No. 2008-511063 describes a shift-by-wire shift device. The shift device includes a rotation knob, a cam, and a C-shaped stopper. The rotation knob is operated to switch the mode of a transmission. The cam is rotatable integrally with the rotation knob. The stopper restricts rotation of the cam. The cam contacts one of two ends of the stopper when the rotation knob reaches a limit position in a predetermined rotation range. This physically restricts rotation of the rotation knob beyond a limit position. A ring gear is provided on the outer circumference of the stopper. The ring gear is engaged with a worm, which is coupled to a motor. The motor rotates the stopper to change the limit position when the stopper and the cam are in contact so that the rotation range of the rotation knob can be changed.

There are many customer demands for vehicles such as those regarding the specifications of shift devices. Various shift devices have thus been developed to meet such demands.

SUMMARY

It is an object of the present invention to provide a shift device including a novel structure.

One aspect of the present invention is a shift device including a knob rotated around a rotary axis to select one of a plurality of modes of a vehicle transmission. A rotary detent member is rotated to a rotation position corresponding to the selected one of the transmission modes. The rotary detent member is arranged coaxially with the knob. A connecting member is movable to a first position and a second position. When the connecting member is located at the first position, the connecting member is engaged with the knob and the rotary detent member to connect the knob and the rotary detent member. When the connecting member is located at the second position, the connecting member is disconnected from the knob. A drive source rotates the connecting member and the rotary detent member. A control circuit controls the drive source. During a normal operation in which a certain condition is unsatisfied, the control circuit controls the drive source to hold the connecting member at the first position. When the certain condition is satisfied, the control circuit controls the drive source to move the connecting member from the first position to the second position and move the rotary detent member to a rotation position corresponding to a parking mode.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

One embodiment of a shift device will now be described.

Figure 1:
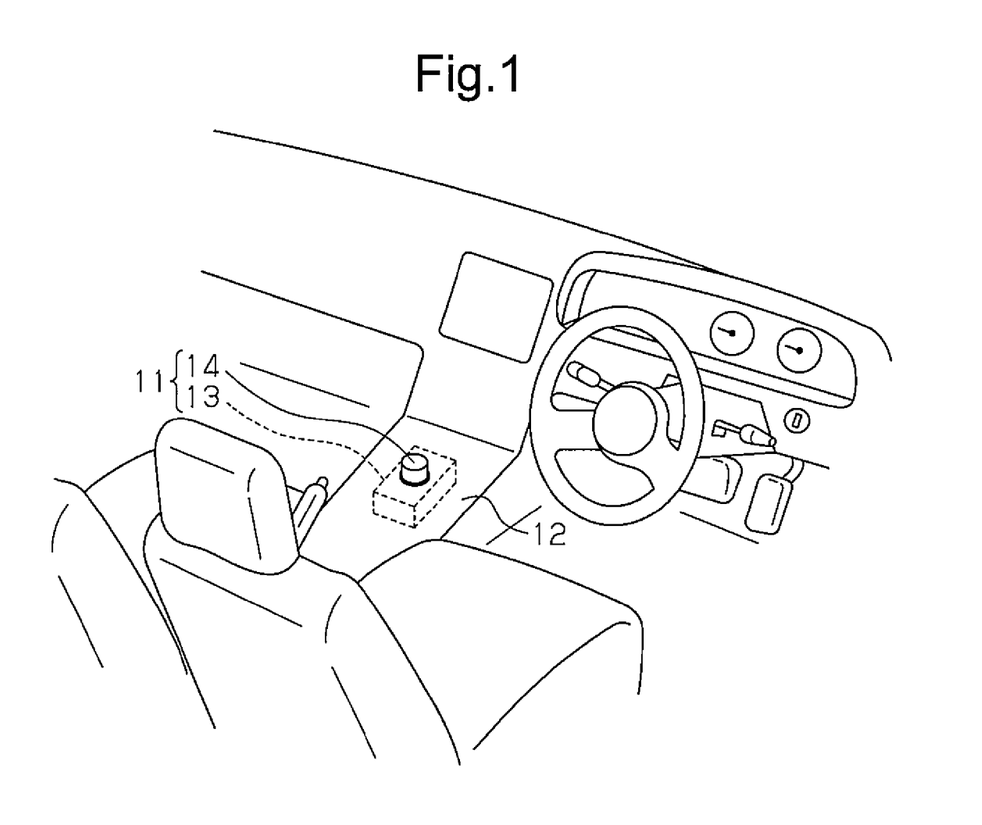
FIG. 1 is a perspective view of a shift device in a passenger compartment.

As shown in FIG. 1, a shift device 11 is located on, for example, a center console 12 of a vehicle. The shift device 11 includes a case 13 and a cylindrical dial knob 14, which is rotatable relative to the case 13. The case 13 is located in the center console 12. The dial knob 14 is exposed from the center console 12. The rotation knob 14 is rotated about a rotary axis Ax (refer to FIG. 2) to shift modes of a transmission (not shown).

Figure 2:
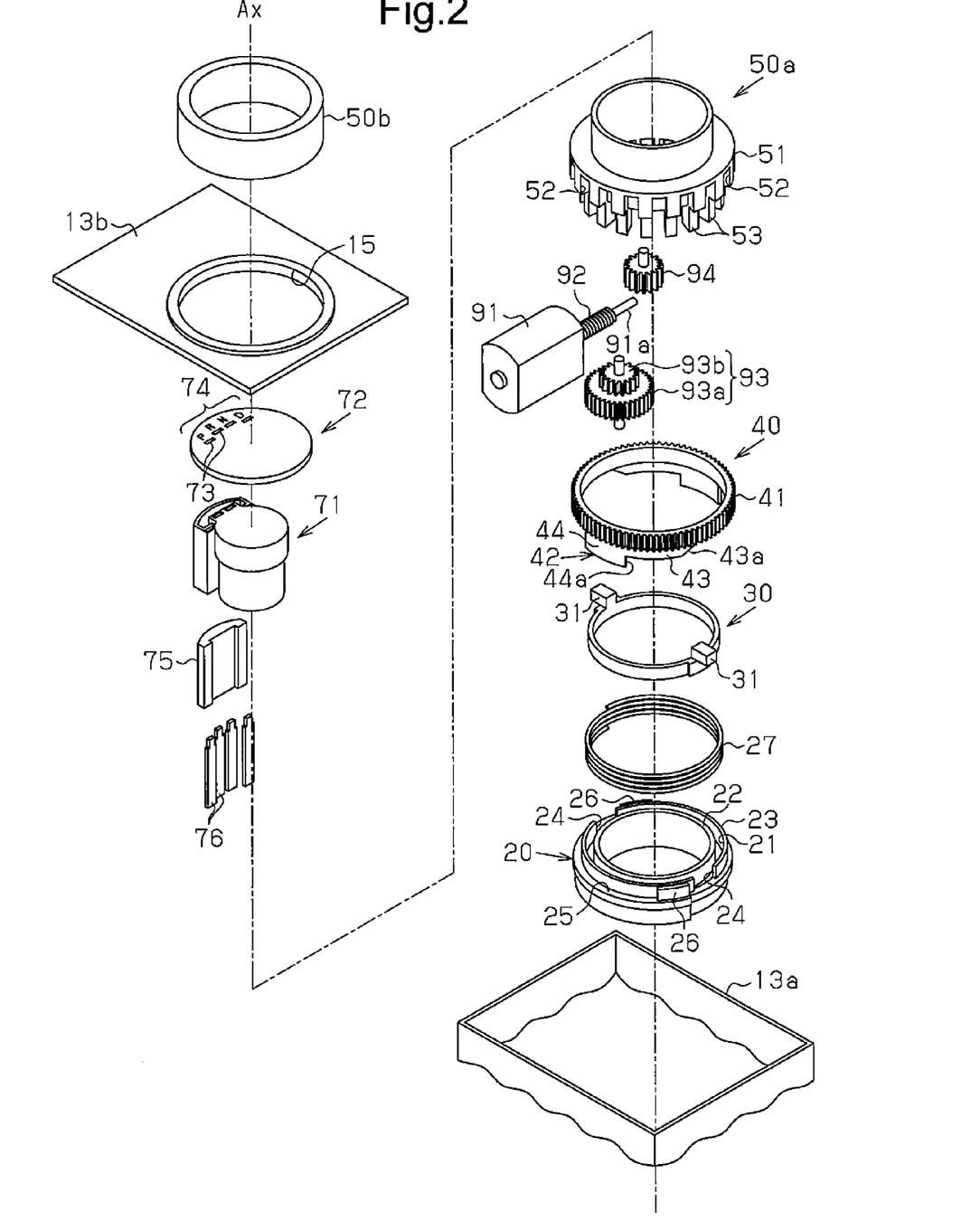
FIG. 2 is an exploded perspective view of the shift device.

As shown in FIG. 2, the case 13 includes a case body 13a, which has an upper opening, and a cover 13b, which closes the upper opening of the case body 13a. The cover 13b includes a hole 15.

The case body 13a accommodates a tubular rotary detent member 20, which is supported to be rotatable. An upper portion of the rotary detent member 20 includes an annular groove 21, an inner wall 22, and an outer wall 23, which defines the annular groove 21 with the inner wall 22. The upper edge of the outer wall 23 includes two slots 24. The slots 24 may be located at opposite sides of the center of the rotary detent member 20, namely, the rotatory axis Ax. The rotary detent member 20 includes an annular step 25, which projects toward the outer side in the radial direction. Two projections 26 project from the circumferential surface of the rotary detent member 20. The projections 26 may be located at opposite sides of the center of the rotary detent member 20, namely, the rotatory axis Ax.

The annular groove 21 accommodates an elastic member 27, which may be a compression spring, and an annular connecting member 30. Two engagement projections 31 project from the upper edge of the connecting member 30. The engagement projections 31 are located at opposite sides of the center of the rotary detent member 20, namely, the rotatory axis Ax, and project toward the outer side in the radial direction of the connecting member 30. The locations of the engagement projections 31 of the connecting member 30 and the slots 24 of the rotary detent member 20 are determined so that the engagement projections 31 are in alignment with the slots 24. Each engagement projection 31 is normally at least partially (e.g., lower half of engagement projection 31) accommodated in the corresponding slot 24. When downwardly directed external force is applied to the connecting member 30, the connecting member 30 is lowered against the urging force of the elastic member 27 and completely accommodated in the corresponding slot 24.

A rotatable cam member 40, which is, for example, tubular, is coupled to an upper portion of the rotary detent member 20. The lower end of the cam member 40 is supported by the step 25 of the rotary detent member 20. The step 25 functions as a seat for the cam member 40. The cam member 40 includes an annular external gear 41 and two cam walls 42. The two cam walls 42 are located at opposite sides of the center of the rotary detent member 20, namely, the rotary axis Ax, and project down from the lower surface of the external gear 41. Each cam wall 42 includes a first wall 43 and a second wall 44. The first wall 43 projects from the lower surface of the external gear 41 over a first height, and the second wall 44 projects from the lower surface of the external gear 41 over a second height that is greater than the first height. In the illustrated example, the locations of the first wall 43 and the second wall 44 are determined so that when the cam member 40 is rotated in the counterclockwise direction, the first wall 43 precedes the second wall 44 in the advancing direction. The first wall 43 includes a sloped surface 43a at the end separated from the second wall 44. The sloped surface 43a, which connects the lower surface of the external gear 41 and the lower surface of the first wall 43 may be straight or curved. A step or a contact surface 44a may be formed at the boundary of the first wall 43 and the second wall 44.

The dial knob 14 is fitted in the cam member 40 and placed on the upper surface of the rotary detent member 20. The dial knob 14 includes a tubular base 50a, which includes an upper tube, and a selector ring 50b, which is coupled to the upper tube of the base 50a.

An axially middle portion of the base 50a in the axial direction defines an annular large diameter portion 51. The circumferential surface of the large diameter portion 51 includes a plurality of engagement recesses 52 arranged at equal intervals. A lower portion of the base 50a includes teeth 53 arranged at equal intervals. The interval (slit width) between two adjacent ones of the teeth 53 is set to be slightly greater than the width of each engagement projection 31 of the connecting member 30. The base 50a is supported by the upper surface of the rotary detent member 20 so that the lower surface of each tooth 53 is slidable on the upper surface.

The selector ring 50b of the knob 14 is fixed to the base 50a covering the upper tube of the base 50a. The lower surface of the selector ring 50b is maintained in contact with the upper surface of the large diameter portion 51. The selector ring 50b is fitted into the hole 15 of the cover 13b from the lower side and exposed from the cover 13b.

A holder 71 is fixed in the case body 13a. The holder 71 is fitted into a hollow portion of the knob 14, that is, a hollow portion of the base 50a.

A disk-shaped cover panel 72 is coupled to an upper portion of the holder 71. The cover panel 72 closes the opening of the base 50a or the selector ring 50b from the inner side. The base 50a and the selector ring 50b are rotatable relative to the cover panel 72. The cover panel 72 includes indicator windows 73. The number of the indicator windows 73 is the same (in this case, four) as the number of the transmission modes. The indicator windows 73 are arranged along a straight line or an arcuate line at locations separated from the center of the cover panel 72. Further, the upper surface (outer surface) of the cover panel 72 includes symbol marks 74 corresponding to the transmission modes. The symbol marks 74 include "P" indicating a parking mode, "R" indicating a reverse mode, "N" indicating a neutral mode, and "D" indicating a drive mode. The symbol marks 74 are arranged in correspondence with the indicator windows 73. Each symbol mark 74 is formed by a translucent material.

The holder 71 holds a light guide 75, which illuminates the symbol marks 74, and light guides 76, which respectively illuminate the indicator windows 73. The light guide 75 may be a flat plate or a curved plate. The upper surface of the light guide 75, that is, the width of the light emitting surface, substantially conforms to the range in which the symbol marks 74 are formed. The light emitting surface of the light guide 75 is located immediately below the formation range of the symbol marks 74. The light guide 75 guides light emitted from a light source (not shown) located immediately below the light guide 75 toward the rear surface of the symbol marks 74. Each light guide 76 may be formed from an elongated flat plate. The distal portion of each light guide 76 including the upper surface or the light emitting surface is fitted to the corresponding indicator window 73 from the lower side of the cover panel 72. This exposes the light guide 76 in the cover panel 72. Each light guide 76 guides light from a corresponding light source (not shown) located immediately below the light guide 76 toward an upper portion of the holder 71 to emit the light out of the corresponding indicator window 73. The presently selected transmission mode can be visually checked with the indicator windows 73 by activating only the light source of the light guide 76 corresponding to the presently selected transmission mode.

A shift lock mechanism 80 will now be described with reference to FIG. 3. The shift lock mechanism 80 is located in the case 13. The shift lock mechanism 80 includes a solenoid 81 and a lock member 82.

The solenoid 81 is located below the rotary detent member 20. The solenoid 81 includes a plunger 81a that extends in a radial direction, which is orthogonal to the rotary axis Ax. A compression coil spring 83 is arranged between the head of the plunger 81a and the solenoid 81. When the solenoid 81 is supplied with power, the plunger 81a is drawn into the solenoid 81 against the elastic force of the compression coil spring 83. When the supply of power to the solenoid 81 is stopped, the elastic force of the compression coil spring 83 returns the plunger 81a to its original position.

Figure 3:
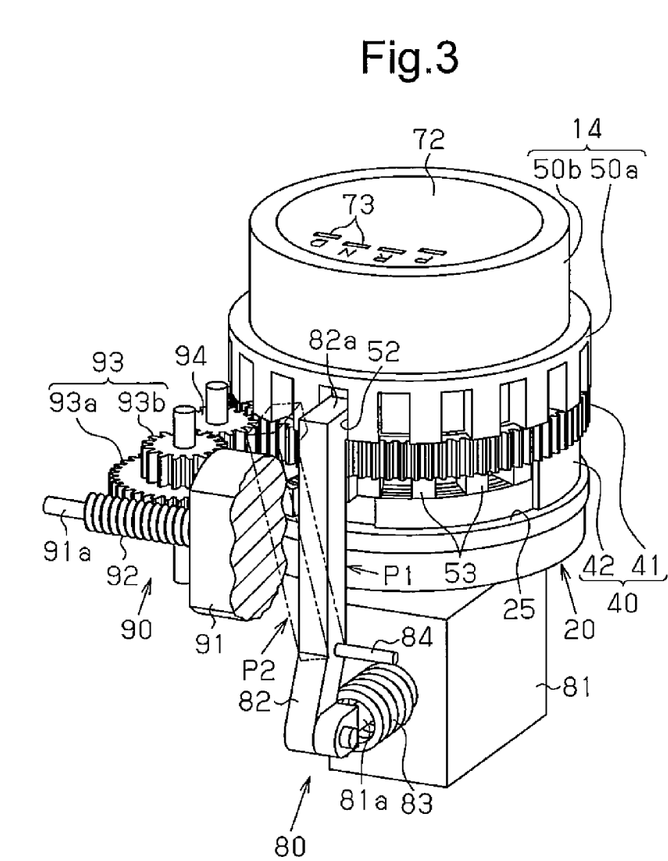
FIGS. 3 and 4 are perspective views of the shift device.

The lock member 82 may be an elongated member extending in the vertical direction as viewed in FIG. 3. The lock member 82 has a lower portion, or basal end, that is pivotally coupled to the head of the plunger 81a. Further, the lock member 82 has an upper portion, or distal end, that includes a hook 82a, which can be engaged with a circumferential surface of the base 50a. The lock member 82 is pivotally supported by a pivot shaft 84, which is located in the case body 13a. The lock member 82 moves in cooperation with the plunger 81a between a lock position P1, which is shown by the solid lines in FIG. 3, and an unlock position P2, which is shown by the double-dashed lines in FIG. 3.

When the plunger 81a is not drawn, the lock member 82 is located at the lock position P1, and the hook 82a is held inside one of the engagement recesses 52 of the base 50a. The engagement of the hook 82a and the engagement recess 52 restricts rotation of the base 50a. For example, when the hook 82a is narrower than the engagement recess 52, the base 50a may slightly rotate until the hook 82a contacts a side wall of an engagement recess 52. However, engagement of the hook 82a with the engagement recess 52 would prohibit further rotation of the base 50a.

When the plunger 81a is drawn, the lock member 82 is located at the unlock position P2, and the hook 82a is held outside the engagement recesses 52 of the base 50a. Thus, the hook 82a is disengaged from the engagement recesses 52. The hook 82a does not restrict rotation of the base 50a.

A drive mechanism 90 that rotates the external gear 41 of the cam member 40 will now be described with reference to FIG. 3. The drive mechanism 90 includes a motor 91, a worm 92, a double gear 93, and a gear 94. The motor 91 is located proximate to the cam member 40. The motor 91 includes an output shaft 91a that is orthogonal and skew to the rotary axis Ax. The worm 92 is coupled coaxially to the output shaft 91a of the motor 91. The double gear 93 rotates about an axis parallel to the rotary axis Ax. The axis of the double gear 93 is orthogonal and skew to the axis of the worm 92. The double gear 93 includes a lower large diameter gear 93a, which is engaged with the worm 92, and an upper small diameter gear 93b, which is engaged with the external gear 41 of the cam member 40 by way of the gear 94. The motor 91 produces rotation that is transmitted to the external gear 41 by the worm 92, the double gear 93, and the gear 94.

Figure 4:
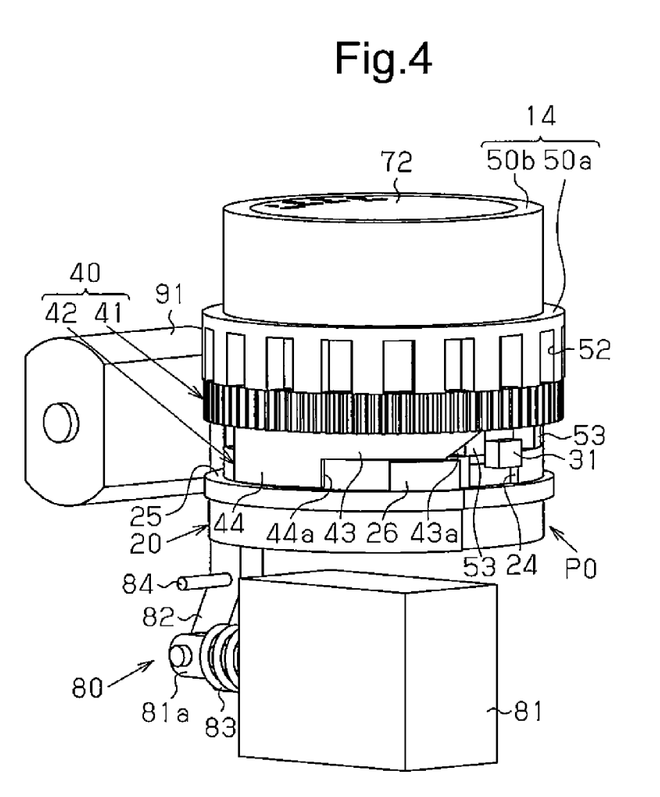

The cam member 40 is normally held at a reference position P0, which is shown in FIG. 4. When the cam member 40 is held at the reference position P0, the first walls 43 of the cam member 40 are proximal and opposed to the corresponding first engagement projections 31 of the connecting member 30 in the circumferential direction of the rotary detent member 20. Further, the second walls 44 (contact surfaces 44a) are spaced apart from and opposed to the corresponding projections 26 of the rotary detent member 20 in the circumferential direction of the rotary detent member 20. The spaced apart distance of the second walls 44 from the corresponding projections 26 is set to be longer than the operation range (P, R, N, and D) of the dial knob 14.

When the cam member 40 is held at the reference position P0, each engagement projection 31 of the connecting member 30 includes a first portion (e.g., upper half of engagement projection 31), located in a slit between adjacent teeth 53 of the base 50a, and a second portion (e.g., lower half of engagement projection 31), located in the corresponding slot 24 of the rotary detent member 20. More specifically, when the cam member 40 is located at the reference position P0, the engagement projection 31 is engaged with the teeth 53 and the slot 24 in the rotation direction of the dial knob 14. Accordingly, if the dial knob 14 is rotated when the lock member 82 is held at the unlock position P2, the rotary detent member 20 would be rotated together or integrally with the dial knob 14. The dial knob 14 (more precisely, the base 50a) and the rotary detent member 20 rotate relative to the cam member 40, and the cam member 40 remains at the reference position P0 without being rotated. To further ensure rotation restriction of the cam member 40, it is preferred that the worm 92, the double gear 93, and the gear 94 transmit power in the same direction in an irreversible manner.

Figure 5A:
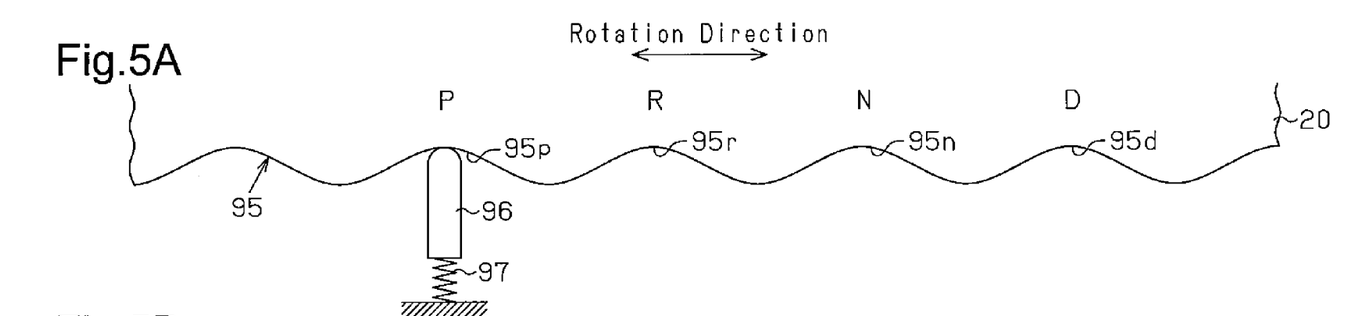
FIG. 5A is a schematic diagram illustrating a guide surface of a rotary detent member formed in correspondence with a plurality of transmission modes.

As shown in FIG. 5A, the lower surface of the rotary detent member 20 includes a guide surface 95. The guide surface 95 includes valleys 95p, 95r, 95n, and 95d arranged in the rotation direction of the rotary detent member 20. The valleys 95p, 95r, 95n, and 95d extend smoothly and continuously with one another in the rotation direction of the rotary detent member 20. The valleys 95p, 95r, 95n, and 95d respectively correspond to rotation positions to which the dial knob 14 is rotated when shifting to the transmission modes "P", "R", "N", and "D".

A pin 96 and a pin spring 97 are arranged in the case 13. The pin spring 97 constantly urges the pin 96 against the guide surface 95. When the rotary detent member 20 is rotated, the distal end of the pin 96, which remains in elastic contact with the guide surface 95, is guided by the guide surface 95 and sequentially engaged with the valleys 95p, 95r, 95n, and 95d.

As a result, the user is provided with a tactile feedback sensation through the dial knob 14. In this manner, the rotary detent member 20 cooperates with the pin 96 and the pin spring 97 to form a detent mechanism that provides a tactile feedback sensation to the user.

The rotation positions of the rotary detent member 20 when the pin 96 is engaged with the valleys 95p, 95r, 95n, and 95d correspond to the transmission modes "P", "R", "N", and "D", respectively. Operation of the dial knob 14 rotates the rotary detent member 20 to rotation positions corresponding to the transmission modes "P", "R", "N", and "D". This shifts the transmission modes.

Figure 6A:
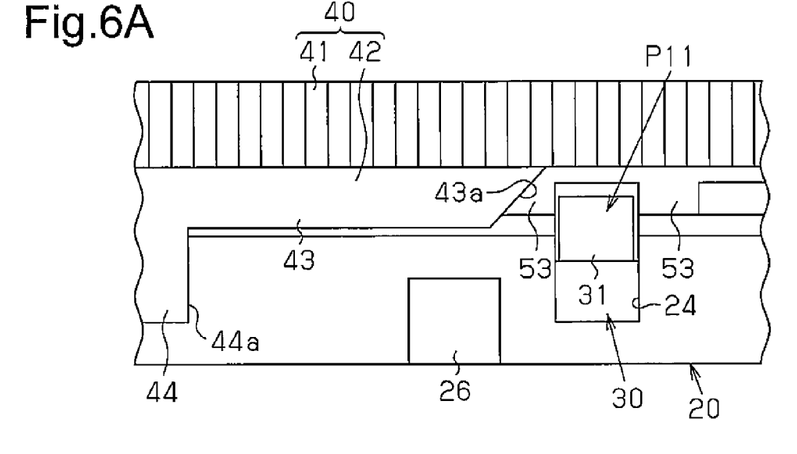
FIG. 6A is a front view showing a connecting member during a normal operation.

Referring to FIG. 6A, the cam member 40 is normally held at a reference position P0, and the engagement projections 31 of the connecting member 30 are held at a first position P11 engaged with the teeth 53 and the slots 24 in the rotation direction of the dial knob 14. Accordingly, when the lock member 82 is held at the unlock position P2, rotation of the dial knob 14 rotates the rotary detent member 20 together or integrally with the dial knob 14.

If the motor 91 is driven when the lock member 82 is held at the lock position P1 and rotation of the dial knob 14 (base 50a) is restricted, the cam member 40 rotates relative to the base 50a. Rotation of the cam member 40 moves the cam wall 42 in the right direction as viewed in FIG. 6A toward the engagement projection 31 of the connecting member 30.

Figure 6B:
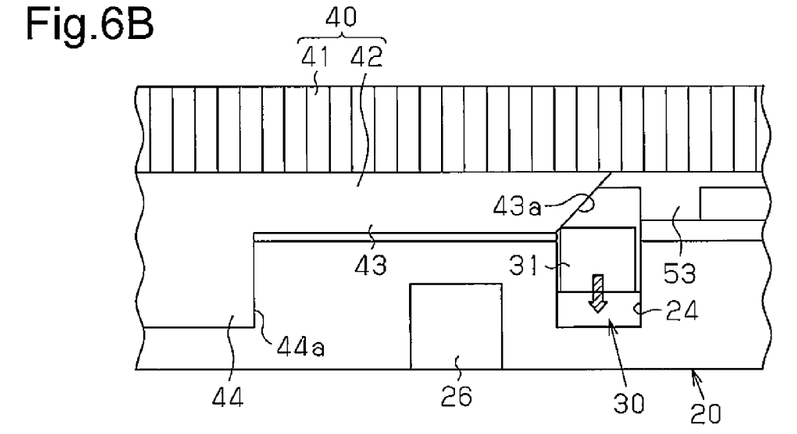
FIG. 6B is a schematic diagram illustrating axial movement of the connecting member in an initial stage of an automatic recovery operation.

Referring to FIG. 6B, as the cam member 40 rotates, the sloped surface 43a of the first wall 43 contacts the engagement projection 31 of the connecting member 30. Further movement of the first wall 43 in the right direction as viewed in FIG. 6B pushes and lowers the engagement projection 31 with the sloped surface 43a. This entirely lowers the connecting member 30, including the engagement projection 31, against the urging force of the elastic member 27.

Figure 6C:
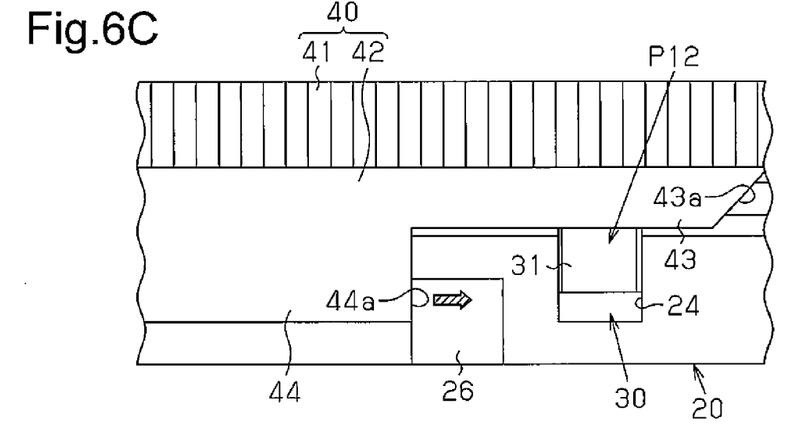
FIG. 6C is a schematic diagram illustrating rotation of the rotary detent member that automatically returns to a parking position.

Referring to FIG. 6C, when the engagement projection 31, which is guided by the sloped surface 43a, reaches the lower surface of the first wall 43, most of the engagement projection 31 is pushed into the slot 24 (second position P12). The upper surface of the engagement projection 31 moves along the lower surface of the first wall 43 as the urging force of the elastic member 27 pushes the upper surface of the engagement projection 31 against the lower surface of the first wall 43. As the cam member 40 further rotates, the contact surface 44a comes into contact with the projection 26 of the rotary detent member 20. Subsequently, the rotary detent member 20 rotates together or integrally with the cam member 40.

In this manner, when the motor 91 rotates the cam member 40, the rotary detent member 20 can be disconnected from the dial knob 14 (base 50a) and solely rotated.

Figure 7:
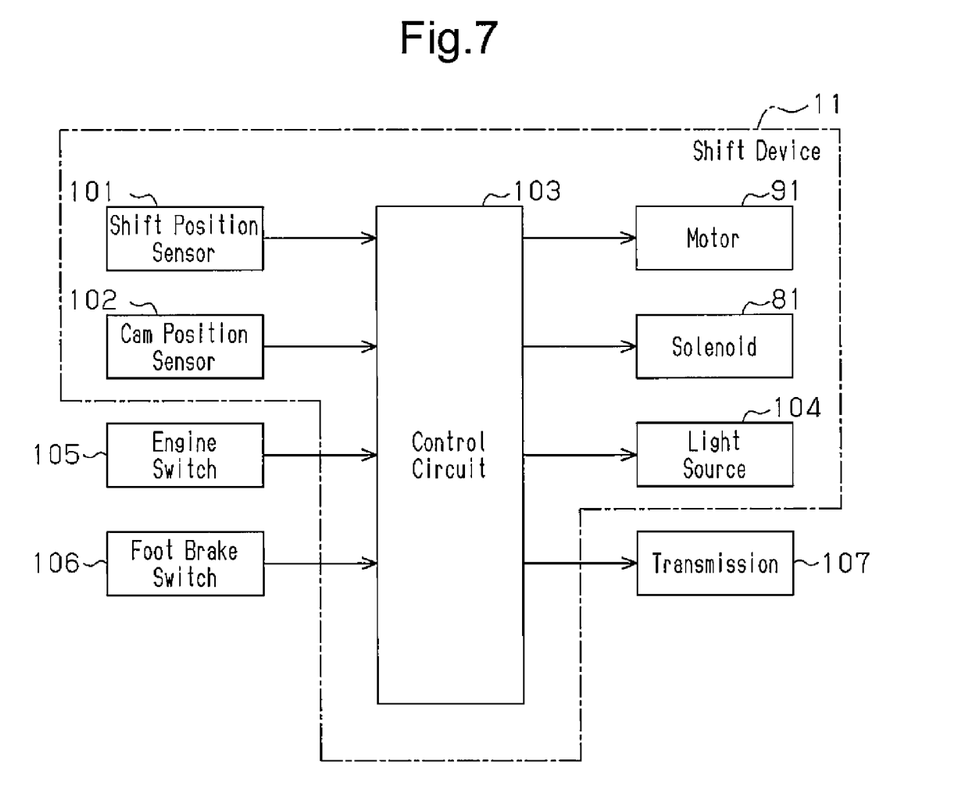
FIG. 7 is a block diagram of the shift device.

The electric configuration of the shift device 11 will now be described with reference to FIG. 7. The shift device 11 includes a shift position sensor 101, a cam position sensor 102, and a control circuit 103. The shift position sensor 101 and the cam position sensor 102 are connected to the control circuit 103. The motor 91, the solenoid 81, a light source 104, an engine switch 105, which is located in the vehicle, a foot brake switch 106, and a transmission 107 are connected to the control circuit 103.

The shift position sensor 101 provides the shift device 11 with an electric signal corresponding to the rotation position of the rotary detent member 20. The cam position sensor 102 detects when the cam member 40 is located at the reference position P0. The light source 104 separately provides the light guide 75 and the light guides 76 with light. The light source 104 may include a plurality of light emitting diodes corresponding to the light guides 75 and 76, respectively. The engine switch 105 detects a manual operation for starting or stopping an engine (not shown), which serves as a vehicle driving power source. The foot brake switch 106 detects when a foot brake (not shown) is depressed.

Based on the electric signal provided from the shift position sensor 101, the control circuit 103 determines the operation position of the dial knob 14, more precisely, whether the rotary detent member 20 is located at the rotation position "P", "R", "N", or "D". The control circuit 103 controls and drives the motor 91 and the solenoid 81 in accordance with the rotation position of the rotary detent member 20 and the activation of the engine switch 105 and the foot brake switch 106.

When detecting any one of predetermined actions that requires the transmission 107 to be shifted to the parking mode, regardless of the operation position of the dial knob 14, the control circuit 103 generates a mode switching command for automatically switching the mode of the transmission 107 to the parking mode. The predetermined actions include, for example, the stopping of the engine, the removal of a mechanical key from a key cylinder, or the opening of a door. The predetermined actions may be detected by one or more sensors including the engine switch 105.

When detecting a predetermined action, the control circuit 103 executes a control in accordance with the present condition of the dial knob 14. For example, in response to an electric signal generated by a sensor that detects a predetermined action, the control circuit 103 starts a control that is in accordance with the condition of the dial knob 14. The electric signal may be, for example, an electric signal indicating that the engine switch 105 has been deactivated, an electric signal indicating that the mechanical key has been removed from the key cylinder, or an electric signal indicating that a door is open.

In one example, when certain conditions are satisfied, the control circuit 103 performs an automatic recovery operation of the dial knob 14 and automatically shifts the dial knob 14 to the rotation position corresponding to the parking mode "P". The certain conditions include the detection of a predetermined action and the dial knob 14 maintained at a rotation position corresponding to the mode "R", "N", or "D" that is a mode other than the parking mode "P".

The automatic recovery operation will now be described. Here, the dial knob 14 is maintained at a rotation position corresponding to the mode "R", "N", or "D" that is a mode other than the parking mode "P". Further, the cam member 40 is held at a reference position P0, and the lock member 82 is held at the unlock position P2.

Figure 8:
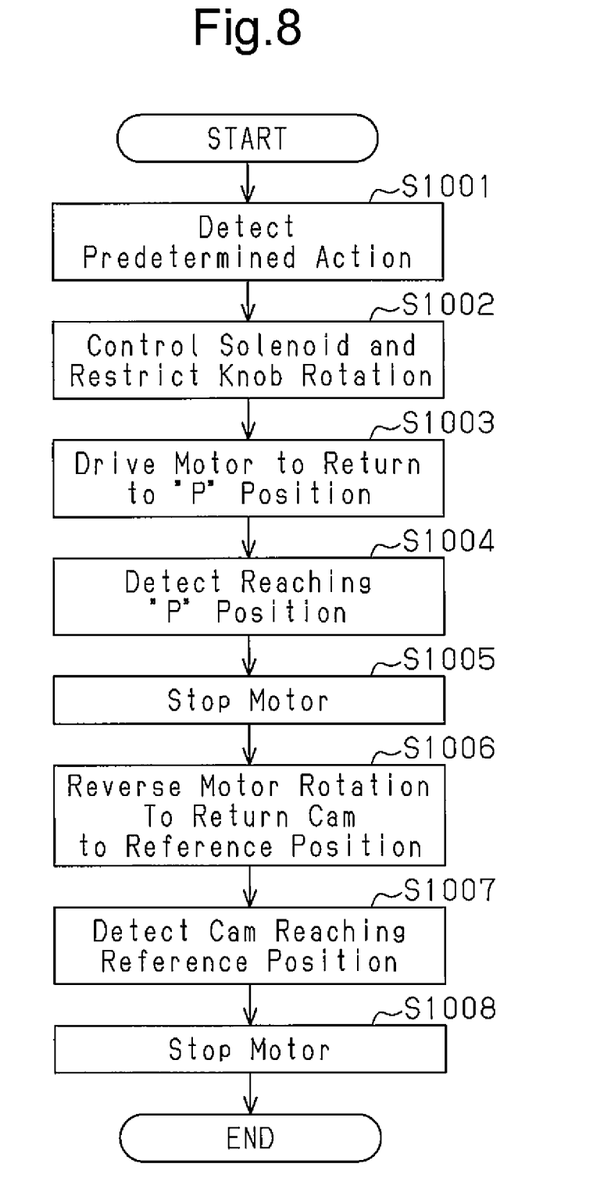
FIG. 8 is a flowchart of the automatic recovery operation.

Referring to the flowchart of FIG. 8, when the control circuit 103 receives an electric signal indicating the detection of a predetermined action (step S1001), the control circuit 103 controls the solenoid 81 to restrict rotation of the dial knob 14 (step S1002). In the illustrated example, the control circuit 103 stops supplying power to the solenoid 81. The plunger 81a is drawn into the solenoid 81, and the lock member 82 is moved from the unlock position P2 to the lock position P1. This restricts rotation of the dial knob 14 and holds the dial knob 14 at the present rotation position.

Then, the control circuit 103 drives the motor 91 to move the rotary detent member 20 to the rotation position corresponding to the parking mode "P" (step S1003). The motor 91 rotates the cam member 40 to disengage the engagement projections 31 of the connecting member 30 from the base 50a (teeth 53), as shown in FIG. 6C. This interrupts power transmission between the rotary detent member 20 and the base 50a. As a result, the rotation of the rotary detent member 20 caused by the motor 91 is not transmitted to the base 50a, and manual rotation of the base 50a is also not transmitted to the rotary detent member 20. Further, the second wall 44 (contact surface 44a) of the cam member 40 contacts the corresponding projection 26 of the rotary detent member 20. This rotates the rotary detent member 20 together or integrally with the cam member 40.

When the shift position sensor 101 detects that the rotary detent member 20 has reached the position corresponding to the parking mode "P" (step S1004), the control circuit 103 stops the motor 91 (step S1005).

Then, the control circuit 103 produces reverse rotation with the motor 91 to return the cam member 40 to the reference position P0 (step S1006). The reverse rotation connects the dial knob 14 and the rotary detent member 20 so that power can be transmitted again when operated the next time.

When the cam position sensor 102 detects that the cam member 40 has returned to the reference position P0 (step S1007), the control circuit stops the motor 91 (step S1008) and ends the processing. When the cam member 40 returns to the reference position P0, the urging force of the elastic member 27 raises the connecting member 30, and the engagement projections 31 are engaged again with both of the base 50a and the rotary detent member 20. This allows the transmission mode to be shifted the next time the dial knob 14 is operated. In this case, the cam member 40 does not interfere with the operation of the dial knob 14.

The automatic recovery operation may be performed when rotation of the dial knob 14 is restricted. When starting the automatic recovery operation, the rotary detent member 20, which is subject to rotation position detection, is disconnected from the dial knob 14. Then, the motor 91 solely rotates the rotary detent member to move the rotary detent member 20 to the rotation position corresponding to the parking mode "P". This limits increases in the motor load and avoids overload of the motor 91. Further, the flow of overcurrent to the motor 91 is limited, and the motor 91 is protected. When the user drives the vehicle again, the user can operate the dial knob 14 as usual.

The embodiment has the advantages described below.

(1) The shift device 11 includes the knob 14, which is rotated about the rotary axis Ax, the rotary detent member 20, which is coaxial with the knob 14, the connecting member 30, which is movable to the first position P11 and the second position P12, the motor 91, which rotates the connecting member 30 and the rotary detent member 20, and the control circuit 103, which controls the motor 91. When the connecting member 30 is located at the first position P11, the connecting member 30 is engaged with the knob 14 and the rotary detent member 20 to connect the knob 14 and the rotary detent member 20. When the connecting member 30 is located at the second position P12, the connecting member 30 is disengaged from the knob 14. During a normal operation in which certain conditions are not satisfied, the control circuit 103 controls the motor 91 to hold the connecting member 30 at the first position P11 (e.g., S1006). When the certain conditions are satisfied, the control circuit 103 controls the motor 91 to move the connecting member 30 from the first position P11 to the second position P12 and move the rotary detent member 20 to the rotation position corresponding to the parking range P (e.g., S1003). In this configuration, during a normal operation, the rotary detent member 20 is rotated integrally with the knob 14 by the connecting member 30 and held at the rotation position corresponding to the selected transmission mode. When the certain conditions are satisfied, the control circuit 103 performs the automatic recovery operation to interrupt power transmission between the dial knob 14 and the rotary detent member 20. Accordingly, the rotation of the knob 14 is not transmitted to the rotary detent member 20. Thus, the motor 91 can rotate the rotary detent member 20 without rotating the knob 14. The motor 91 can move the rotary detent member 20 to the rotation position corresponding to the parking range. Even when the user holds the knob 14 with a hand, the shift device 11 rotates the rotary detent member 20 with the motor 91 while limiting increases in the motor load to shift the transmission mode to the parking mode P.

(2) During an automatic recovery operation, when the motor 91 rotates the rotary detent member 20, rotation of the dial knob 14 (base 50a) is restricted. This allows the rotary detent member 20 to be solely rotated, and the dial knob 14 does not rotate together with the rotary detent member 20.

(3) The rotation of the dial knob 14 is normally transmitted to the rotary detent member 20 by the connecting member 30. During an automatic recovery operation, the motor 91 rotates the cam member 40 to disengage the connecting member 30 from the dial knob 14 (base 50a). This allows the structure of the shift device 11 to be simplified. Further, the shift device 11 can be reduced in size.

(4) The dial knob 14 rotates relative to the cover panel 72, which functions as an indicator for indicating the present transmission mode. Regardless of whether or not the dial knob 14 is operated, the cover panel 72 is constantly held in the same direction. Thus, the driver can easily check the indication of the cover panel 72.

(5) The connecting member 30 includes the engagement projections 31, which function as connecting portions for connecting the dial knob 14 and the rotary detent member 20. The engagement projections 31 are located on opposite sides of the center of the center of the rotary detent member 20, namely, the rotatory axis Ax. Thus, the rotary detent member 20 stably rotates in cooperation with the rotation of the dial knob 14. This reduces or limits rattling of the connecting member 30 and the rotary detent member 20 when rotated.

(6) The elastic member 27 urges the connecting member 30 toward the first position P11 in the axial direction. When the connecting member 30 is located at the first position P11, the engagement projections 31 of the connecting member 30 are located at the boundary between the knob 14 and the rotary detent member 20 in the axial direction. The cam member 40, which is opposed to the boundary, is rotated by the motor 91 around the knob 14 and the rotary detent member 20. When the cam member 40 is rotated in a first rotation direction, the cam walls 42 of the cam member 40 are engaged with the connecting member 30. As a result, the cam walls 42 of the cam member 40 contacts the projections 26 of the rotary detent member 20 in the first rotation direction while pushing the connecting member 30 in the axial direction from the first position P11 to the second position P12 against the urging force of the elastic member 27. When the control circuit 103 detects rotation of the rotary detent member 20 to the rotation position corresponding to the parking mode P, the control circuit 103 rotates the cam member 40 with the motor 91 in a second rotation direction, which is opposite to the first rotation direction, and returns the cam member 40 to the original position.

In this structure, the motor 91 rotates the cam member 40 to move the connecting member 30 from the first position P11 to the second position P12. Further, the cam member 40, which is rotated by the motor 91, pushes the rotary detent member 20 to move the rotary detent member 20 to the rotation position corresponding to the parking mode P. Once the rotary detent member 20 reaches the rotation position corresponding to the parking mode P, it is preferred that the cam member 40 be returned to its original position. When the cam member 40 is returned to the original position, the elastic member 27 automatically returns the connecting member 30 from the second position P12 to the first position P11. As a result, the rotary detent member 20 can be rotated again integrally with the knob 14. Further, by returning the cam member 40 to the original position with the motor 91, the cam member 40 does not interfere with the rotation of the knob 14 for switching from the parking mode to another transmission mode. Accordingly, the rotary detent member 20 can be rotated smoothly with the knob 14. Further, the cam member 40, which has a simple structure, allows the shift device 11 to be reduced in size.

It should be apparent to those skilled in the art that the present invention may be embodied in many other specific forms without departing from the spirit or scope of the invention. Particularly, it should be understood that the present invention may be embodied in the following forms.

Figure 5B:
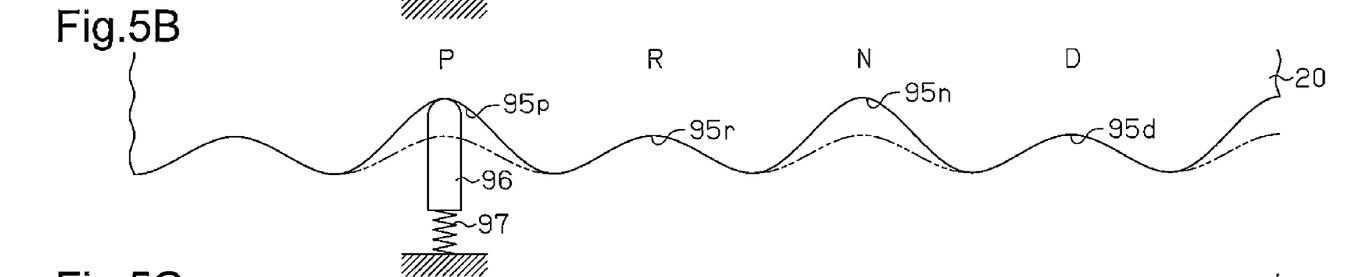
FIG. 5B is a schematic diagram illustrating a first modified example of the guide surface.
Figure 5C:
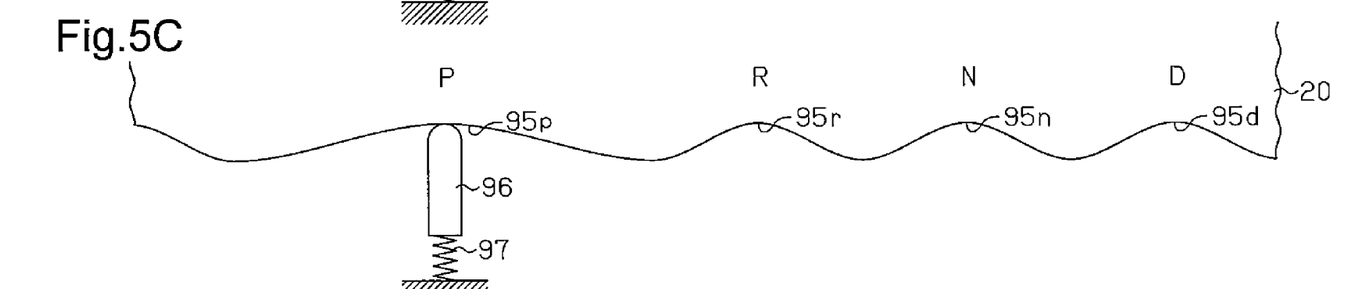
FIG. 5C is a schematic diagram illustrating a second modified example of the guide surface.

The valleys 95p, 95r, 95n, and 95d in the guide surface 95 may have the same depth, as shown in FIG. 5A, or different depths. For example, as shown in FIG. 5B, the valley 95p, which corresponds to the parking mode "P", may be deeper than the other valleys 95r, 95n, and 95d. Further, in the rotation direction of the rotary detent member 20, the valleys 95p, 95r, 95n, and 95d in the guide surface 95 may have the same length, as shown in FIG. 5A, or different lengths. For example, as shown in FIG. 5C, the valley 95p, which corresponds to the parking mode "P", may be longer than the other valleys 95r, 95n, and 95d. In such cases, when shifting the transmission to the parking mode "P", the user is provided with a tactile feedback sensation through the dial knob 14 that differs from the tactile feedback sensation provided when shifting to other transmission modes. This allows the user to be aware whether the transmission has been shifted from the parking mode "P" to another mode or whether the transmission has been shifted from another mode to the parking mode "P". Depending on the product specification, the depth or length of the valley 95n corresponding to the neutral mode "N" may differ from the other valleys. This provides contrasting tactile feedback sensations when switching transmission modes. Regardless of whether the valleys 95p, 95r, 95n, and 95d have different depths or lengths, the same tactile feedback sensation is always obtained when shifting to the same transmission mode. This is because the rotary detent member 20 is always returned to the position corresponding to the parking mode "P" when an automatic recovery operation is performed. The first modified examples of FIGS. 5B and 5C allows the rotation of the knob 14 to be weighted and allows the tactile feel when operating the knob 14 to be changed.

In the flowchart of FIG. 8, processing order of steps S1002 and S1003 may be reversed.

The dial knob 14 does not need to have a shape (outer shape of selector ring 50b) that is cylindrical. For example, the dial knob 14 may use a selector ring 50b having the shape of a polygonal post, such as a tetragonal or a pentagonal post, or the shape of an elliptic post.

The connecting member 30 of the present example includes the two engagement projections 31. However, there may be only one engagement projection 31. Alternatively, there may be three or more engagement projections 31. The number of the engagement projections may be set in accordance with the product specification.

In the present example, the four operation positions "P", "R", "N", and "D" are set for the dial knob 14. However, the number of the operation positions need only be set in accordance with the transmission modes set for the transmission 107. The same applies for the number and layout interval of the valleys 95p, 95r, 95n, and 95d.

The detent mechanism including the guide surface 95 and the pin 96 is not limited to the illustrated example. For example, the guide surface 95 may be defined by a portion of the rotary detent member 20 other than the lower surface, such as a side surface of the rotary detent member 20. Further, the pin 96 may be located on the rotary detent member 20, and the guide surface 95 may be located on the case 13.

In the present example, the solenoid 81 is used as a drive source for the shift lock mechanism 80. However, a motor may be used in lieu of the solenoid 81. In this case, a further mechanism is used to convert the rotation produced by the motor to move the lock member 82 from the lock position P1 to the unlock position P2.

The indicator of the dial knob 14 does not have to include the cover panel 72 (indicator windows 73 and symbol marks 74) and the light guides 75 and 76. For example, the light guides 75 and 76 do not have to be used.

In the present example, the engagement projections 31 of the cam member 40 connect the dial knob 14 (base 50a) and the rotary detent member 20 so that power can be transmitted. Instead, for example, the engagement projection 31 may be an independent member moved between a connected position and a disconnected position by an actuator. The connected position is where the engagement projection 31 can transmit power between base 50a and the rotary detent member 20 and corresponds to the first position P11 in the present example. The disconnected position is where the engagement projection 31 is disconnected from the base 50a and the rotary detent member 20 and corresponds to the second position P12 in the present example. When the base 50a and the rotary detent member 20 are disconnected from each other, the motor 91 drives and rotates the cam member 40. Such a structure would obtain the same advantages as the present example.

The present examples and embodiments are to be considered as illustrative and not restrictive, and the invention is not to be limited to the details given herein, but may be modified within the scope and equivalence of the appended claims.

The invention claimed is:

1. A shift device comprising:
   a knob rotated around a rotary axis to select one of a plurality of modes of a vehicle transmission;
   a rotary detent member rotated to a rotation position corresponding to the selected one of the transmission modes, wherein the rotary detent member is arranged coaxially with the knob;
   a connecting member that is movable to a first position and a second position, wherein
      when the connecting member is located at the first position, the connecting member is engaged with the knob and the rotary detent member to connect the knob and the rotary detent member, and
      when the connecting member is located at the second position, the connecting member is disconnected from the knob;
   a drive source that rotates the connecting member and the rotary detent member; and
   a control circuit that controls the drive source, wherein
      during a normal operation in which a certain condition is unsatisfied, the control circuit controls the drive source to hold the connecting member at the first position, and
      when the certain condition is satisfied, the control circuit controls the drive source to move the connecting member from the first position to the second position and move the rotary detent member to a rotation position corresponding to a parking mode.

2. The shift device according to claim 1, further comprising:
   an elastic member that urges the connecting member in an axial direction toward the first position, wherein when the connecting member is located at the first position, a portion of the connecting member is located in a boundary of the knob and the rotary detent member in the axial direction; and
   a cam member rotated around the knob and the rotary detent member in cooperation with activation of the drive source, wherein the cam member is opposed to the boundary, wherein
   the cam member includes a cam wall, and the cam wall is configured so that when the cam member rotates in a first rotation direction, the cam wall engages the connecting member and contacts a portion of the rotary detent member in the first rotation direction while pushing the connecting member in the axial direction from the first position toward the second position against an urging force of the elastic member, and
   when detecting that the rotary detent member has been rotated to a rotation position corresponding to the parking mode, the control circuit rotates the cam member with the drive source in a second rotation direction, which is opposite to the first rotation direction, and returns the cam member to its original position.

3. The shift device according to claim 1, wherein the knob is maintained in contact with the rotary detent member in the axial direction, the shift device further comprising:
   a lock drive source that differs from the drive source; and
   a lock member moved by the lock drive source between a lock position where the lock member restricts rotation of the knob and an unlock position where the lock member allows rotation of the knob, wherein
   the control circuit controls the lock drive source to hold the lock member at the unlock position during a normal operation, and
   the control circuit controls the lock drive source to move the lock member when the certain condition is satisfied from the unlock position to the lock position.

4. The shift device according to claim 1, wherein the certain condition includes a vehicle driving power source being switched from an activated condition to a stopped condition.

5. The shift device according to claim 1, wherein
   the knob is cylindrical and includes a hollow portion,
   an indicator is located in the hollow portion of the knob, and
   the knob is rotatable relative to the indicator.

* * * * *